United States Patent Office 2,815,263
Patented Dec. 3, 1957

2,815,263

TREATMENT OF ORES AND METALLURGICAL PRODUCTS

Robert B. Eldredge, Denver, Colo.

No Drawing. Application October 5, 1953,
Serial No. 384,331

14 Claims. (Cl. 23—14.5)

This invention relates to the treatment of ores and metallurgical products containing a mineral having oxygen and one or more of the metals uranium, molybdenum, vanadium and tungsten. Usually, the oxygen and metal will be in the oxide form, and generally combined with oxide forms of other metals or with water of crystallization. Such oxide forms will be referred to herein generally as oxides.

In the treatment of uranium ores, and particularly uranium ores which contain other metals such as vanadium, molybdenum or tungsten, the content of uranium and/or the other metals is usually relatively low. Thus, uranium ores may contain as low as one-tenth of one percent or less of the metal to be recovered. To separate the uranium, and/or the other metals from such ores, as by flotation, requires that an unduly large amount of ore be treated. To grind fine enough for flotation is relatively expensive and to float off only one percent or less of the total ore treated increases considerably the cost of treatment. Thus, it is desirable to obtain a concentrate which contains a sufficiently high percentage of the metal to be recovered, irrespective of whether the metal is combined with other elements such as in an oxide, sulphide, cyanide, phosphate or the like, since if the concentration of the metal is sufficiently high, the cost of treatment, as per pound of metal to be recovered, is generally not prohibitive.

Among the objects of this invention are to provide a novel method of treatment of ores and the like, particularly uranium ores and metallurgical products; to provide such a method which is applicable also to the treatment of uranium ores containing other metals and compounds thereof, particularly molybdenum, vanadium, or tungsten; to provide such a method which is particularly applicable to the treatment of ores and metallurgical products containing oxides of uranium, vanadium, molybdenum or tungsten; to provide such a method by which ores and the like having relatively low concentrations of the metal to be recovered may be treated economically; to provide such a method which permits large amounts of relatively low value ores and the like to be treated with a minimum of attention to the entire amount of the ore; to provide such a method in which the amount of reagents used is generally in proportion to the amount of metal to be recovered; and to provide such a method which may be varied in accordance with the metals contained in the ore and the like.

Additional objects and the novel features of this invention will become apparent from the description which follows.

The method of this invention is particularly applicable to hydrous oxides, such as carnotite, generally considered to be $K_2O.2U_2O_3.V_2O_5.2H_2O$, i. e., a hydrous oxide of potassium, uranium and vanadium. In the carnotite ores found in the Colorado plateau, the uranium and vanadium content is relatively low, the carnotite itself being incorporated in a large amount of waste material, or gangue, largely silicates. The method of this invention is, of course, applicable to other ores containing oxides of uranium, vanadium, molybdenum, or tungsten, and to such ores containing minerals with other metals combined therewith. In general, the method of this invention may be found less economically feasible for ores having minerals which contain, for instance, lead, antimony or bismuth combined in the compound containing the uranium, vanadium, molybdenum or tungsten, because of the tendency for the former metals to consume undue amounts of reagents without proportional separation returns, while a mineral containing a silicate, as distinguished from silicates in the gangue, may sufficiently retard the reaction as to render the operation economically unsound. Thus, in addition to carnotite, ores which may be treated with suitable results include such ores as autunite, becquerelite, cuprotungstite, ferghanite, feritungstite, johannite, medjidite, phosphuranylite, pitchblende, powellite, randite, rauvite, rossite, rutherfordite, scheelite, schroeckeringite, torbernite, tungstite, tuyuyamunite, uranochalcite, uranoniobite, uranopilite, uvanite, voglite, fourmarierite, uraninite, uranothallite, and zippite. On the other hand, it may prove undesirable to attempt to treat such ores as chillagite, clarkeite, curite, dewindtite, dumontite, ferberite, kasolite, parsonsite, pibarite, raspite, sklodowskite, stolzite, tragorite, metazeunerite, uranophane, uranospinite, vanadinite, fayalite, and zeunerite. It will be understood, of course, that the method of this invention may be applied to metallurgical products other than actual ores, and particularly to the metallurgical products formed from sulphide ores, which have been roasted to form oxides.

In the method of this invention, the ore or metallurgical product to be treated is ground sufficiently, so that the mineral containing uranium or other compound to be separated will exist in a comparatively free state. In the case of relatively porous ore, the particles resulting from grinding may be larger, since the leaching solution employed will be better able to reach the mineral components to be extracted. Thus, the ground ore or product is then treated with a leaching solution, which is preferably made by treating a cool or warm solution, preferably substantially saturated, of an alkali metal cyanide, such as KCN or NaCN, with $CO_2$ and oxygen or suitable oxygen containing gas, such as air. The $CO_2$ and oxygen are passed into the solution until the cyanide appears nearly all to be decomposed, i. e., the solution changes color. The compounds existing in such a solution may consist of sodium or potassium cyanates, with perhaps sodium or potassium formates, carbonates and/or bicarbonates, and it will be understood that the solution itself may be prepared by dissolving equivalent amounts of these compounds in an aqueous solution. Also, the solution may be formed by dissolving calcium cyanamid in water, passing $CO_2$ and $O_2$ through the solution, adding sodium or potassium, and then filtering off the lime and any other residue precipitated. The reducing power of the leaching solution may be enhanced by adding activated carbon, sugar, and the like.

The ground ore is mixed and agitated with the leaching solution for a sufficient period of time to permit the metal compounds to be recovered to be dissolved in the solution, and the solution is then drawn off by decantation or filtration, the former being preferred because of the expense of the latter, so that the remaining waste solid can be discarded. The solution which is drawn off is much more readily handled than the ore, and contains dissolved therein the metal or metals to be recovered, such as uranium, tungsten, molybdenum or vanadium compounds. A counter current operation may be employed, in which fresh solution is applied to substantially exhausted ore, with the solution resulting being applied to less exhausted ore, and so on, until the fresh ore is contacted by solution which is substantially exhausted in the sense that the dissolving power has been almost used up. Fresh solution may be made up from wash water which has been passed through the tailings. In any event, after final contact with the ore, the solution is then acidified, as by $H_2SO_4$, HCl, or other acid, and a complex precipitate thereby formed. In the case of uranium, the precipitate is filtered off. If control tests indicate that recoverable uranium is still in the solution, a potassium iron cyanide, such as $K_4Fe(CN)_6 \cdot 3H_2O$ or $K_3Fe(CN)_6$ may be added to the solution to precipitate the additional uranium as a corresponding uranium iron cyanide. The recovered uranium iron cyanide thus produced may be heated to break down the compound, for easier recovery of the uranium, or may be additionally treated with $NH_4OH$ and $Na_3PO_4$, to produce a uranyl phosphate, such as $UO_2(HPO_4) \cdot 4H_2O$, which may be utilized in any desired manner.

In the event that the ore or metallurgical product to be treated contains vanadium, either as a part of the mineral or as an additional compound contained in the ore, the solution recovered after the initial leaching or after treatment with a dilute acid solution, is preferably treated with concentrated sulphuric acid, so that the vanadium may be recovered as vanadic acid. The vanadic acid may be separated from the remainder of the precipitate, if any, by chemical means, by flotation, or in any other suitable manner. In the event that the ore or metallurgical product contains molybdenum or tungsten or both, the molybdenum or tungsten may be recovered by adding $H_2S$ to the solution which results from leaching, or to the solution remaining after the uranium has been recovered, in the event uranium is present, and then decanting to recover the molybdenum or tungsten as a sulphide. This molybdenum or tungsten sulphide may then be treated in a conventional manner, to recover the metal in a more readily usable form.

In one example of the method of this invention, one half pound of carnotite ore from Paradox Valley was ground to about 65 mesh, and a leaching solution was prepared by forming a 10% aqueous solution of KCN, and passing $CO_2$ and air into the solution until the solution turned a straw yellow color. (The solution can be treated with $CO_2$ and air or $O_2$ until it turns black.) Then, the ground ore was immersed in the leaching solution and for one half hour was agitated sufficiently to prevent any particles from settling out. At that time the yellow color had disappeared. (For carnotite, if the yellow color does not disappear after agitation for a longer time, additional solution may be added, or a stronger solution may be utilized.) The resulting liquid was then decanted, and to the liquid thus obtained a 10% solution of $H_2SO_4$ was added, until no more grayish to green precipitate would form. This precipitate was filtered off and found to contain complex uranium cyanides.

In another experiment, a weak potassium ferrocyanide solution was added to decanted liquid which had been acidified, but from which not all of the uranium had been recovered, and a brownish yellow precipitate, found to be a uranium iron cyanide, was recovered. Also, a ground ore containing an iron-molybdenum oxide, from Climax, Colorado, was treated with a similar leaching solution, and after acidification with a dilute $H_2SO_4$ solution, $H_2S$ was passed therethrough and a molybdenum sulfide precipitate recovered.

Minerals containing lead, arsenic or antimony, may prove uneconomical to treat, because these metals react readily with the leaching solution, and an undue amount of leaching solution may therefore have to be utilized. Also, a silicate, when present in the mineral as distinguished from the gangue, appears to retard the reaction with uranium, vanadium, molybdenum or tungsten, so that the recovery may not be sufficient to warrant the treatment.

It will be understood, of course, that numerous variations in the method of this invention may be utilized. For instance, only the uranium may be recovered, in the manner described, while other components of the ore may be recovered in other ways, although chemical treatment of the solution should be found to be highly satisfactory. The leaching solution may be made in other ways than as indicated, although the most convenient way will usually be found to consist in passing $CO_2$ and oxygen or a suitable oxygen containing gas through a solution of an alkali metal cyanide, preferably KCN or NaCN. Other variations may also be utilized, without departing from the spirit and scope of this invention.

What is claimed is:

1. A method of treating ores and metallurgical products containing a mineral having oxygen and a metal selected from the group consisting of uranium, vanadium, molybdenum and tungsten, which comprises grinding said ore to a sufficient extent to produce relatively free mineral particles; forming a leaching solution by treating an aqueous solution of an alkali metal cyanide with carbon dioxide and oxygen, until the color of said solution changes; agitating the ground ore with said leaching solution for a sufficient period of time to cause a substantial portion of said metal oxide to dissolve in said solution; and separating the remaining solids from the solution.

2. A method as defined in claim 1, wherein said mineral contains uranium, and wherein the solution, remaining after separation of solids, is treated with an acid solution, and the precipitate formed by said acid treatment is further treated with an alkali metal iron cyanide, and the resulting precipitate is separated therefrom.

3. A method as defined in claim 1, wherein said mineral contains an oxide of vanadium, and wherein the solution is treated with sulfuric acid.

4. A method as defined in claim 1, wherein a reducing agent, selected from the group consisting of sugar and activated carbon, is added to said leaching solution.

5. A method as defined in claim 1, wherein said mineral contains uranium, and wherein the solution, remaining after separation of solids, is treated with an acid solution, and the precipitate formed thereby is separated.

6. A method as defined in claim 1, wherein said mineral contains molybdenum, and wherein hydrogen sulfide is passed through said solution.

7. A method as defined in claim 1, wherein said mineral contains tungsten, and wherein hydrogen sulfide is passed through said solution.

8. A method as defined in claim 1, wherein said leaching solution is maintained alkaline.

9. A method of treating ores and metallurgical products containing a mineral which includes oxygen, uranium and vanadium, which comprises grinding said ore to a sufficient extent to produce relatively free mineral particles; forming a leaching solution by treating an aqueous solution of an alkali metal cyanide with carbon dioxide and oxygen until the color of said solution becomes yellowish to black; agitating the ground ore with said ore treating solution for a sufficient period of time to cause a substantial portion of said oxides to dissolve in said solution; separating the remaining solids from the solution; treating said separated solution with a dilute acid solution; separating the precipitate formed by said acid treatment; and treating the remaining solution with concentrated sulfuric acid.

10. A method of treating ores and metallurgical products containing a mineral including oxygen and a metal selected from the group consisting of tungsten and molybdenum, which comprises grinding said ore to a sufficient extent to produce relatively free mineral particles; forming a leaching solution by treating an aqueous solution of an alkali metal cyanide with carbon dioxide and oxygen until the color of said solution changes; agitating the ground ore with said leaching solution for a sufficient period of time to cause a substantial portion of said oxide to dissolve in said solution; separating the remaining solids from the solution; acidifying said separated solution; and passing hydrogen sulfide through the acidified solution.

11. A method of treating ores and metallurgical products containing a hydrous mineral containing oxygen and a metal selected from the group consisting of uranium, vanadium, molybdenum and tungsten, said mineral being substantially free of lead, arsenic, antimony and combined silicates, which comprises grinding said ore to a sufficient extent to produce relatively free mineral particles; producing a leaching solution by treating an aqueous solution of an alkali metal cyanide with carbon dioxide and oxygen until the solution changes color to yellowish to black; agitating the ground ore with said leaching solution for a sufficient period of time to cause a substantial portion of said metal oxide to dissolve in said solution; separating the remaining solids from the solution; treating said separated solution with an aqueous acid solution; and separating any precipitate formed by said acid treatment.

12. A method as defined in claim 11, wherein said mineral includes an element selected from the group consisting of copper and phosphorus.

13. A method of treating ores and metallurgical products containing a mineral having oxygen and a metal selected from the group consisting of uranium, vanadium, molybdenum and tungsten, which comprises grinding said ore to a sufficient extent to produce relatively free mineral particles; forming an aqueous leaching solution containing an alkali metal cyanate; agitating the ground ore with said leaching solution for a sufficient period of time to cause a substantial portion of said metal oxide to dissolve in said solution; and separating the remaining solids from the solution.

14. A method of treating ores and metallurgical products containing a mineral having oxygen and a metal selected from the group consisting of uranium, vanadium, molybdenum and tungsten, which comprises grinding said ore to a sufficient extent to produce relatively free mineral particles; forming a leaching solution by passing carbon dioxide and oxygen through an aqueous solution of calcium cyanamid, adding an alkali metal, and filtering off precipitated residue including lime; agitating the ground ore with said leaching solution for a sufficient period of time to cause a substantial portion of said metal oxide to dissolve in said solution; and separating the remaining solids from the solution.

References Cited in the file of this patent

UNITED STATES PATENTS

| | | |
|---|---|---|
| 808,839 | Haynes et al. | Jan. 2, 1906 |
| 2,597,504 | Larsson | May 20, 1952 |